US008698772B2

(12) United States Patent
Grieve (10) Patent No.: US 8,698,772 B2
(45) Date of Patent: Apr. 15, 2014

(54) VISUAL OBJECT MANIPULATION

(75) Inventor: Andrew Grieve, Waterloo (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/594,599

(22) Filed: Aug. 24, 2012

(65) Prior Publication Data

US 2014/0055372 A1 Feb. 27, 2014

(51) Int. Cl.
*G06F 3/041* (2006.01)

(52) U.S. Cl.
CPC ..................................... *G06F 3/041* (2013.01)
USPC ......................................................... 345/173

(58) Field of Classification Search
USPC ................................. 345/156–184
See application file for complete search history.

(56) References Cited

U.S. PATENT DOCUMENTS

| 5,760,773 | A | 6/1998 | Berman et al. | |
|---|---|---|---|---|
| 2002/0075333 | A1* | 6/2002 | Dutta et al. | 345/862 |
| 2006/0007115 | A1* | 1/2006 | Furuhashi et al. | 345/156 |
| 2006/0026521 | A1* | 2/2006 | Hotelling et al. | 715/702 |
| 2006/0161871 | A1* | 7/2006 | Hotelling et al. | 715/863 |
| 2007/0097096 | A1 | 5/2007 | Rosenberg | |
| 2008/0165153 | A1 | 7/2008 | Platzer et al. | |
| 2009/0055843 | A1 | 2/2009 | Engber et al. | |
| 2009/0160809 | A1* | 6/2009 | Yang et al. | 345/173 |
| 2010/0079405 | A1* | 4/2010 | Bernstein | 345/174 |
| 2010/0275123 | A1 | 10/2010 | Yu et al. | |
| 2011/0069016 | A1 | 3/2011 | Victor | |
| 2011/0169753 | A1 | 7/2011 | Shimamura | |

OTHER PUBLICATIONS

Mathis, "ignore the code: Gestures," Powered by Fusion, retrieved from http://ignorethecode.net/blog/2010/05/25/gestures/, accessed on May 25, 2010, 5pp.
"Move a Shape in a Smart Art graphic," retrieved from http://office.microsoft.com/en-us/word-help/move-a-shape-in-a-smartart-graphic-HA001205871.aspx, accessed on Nov. 15, 2011, 4 pp.
Piekarski et al., "Unifying Augmented Reality and Virtual User Interfaces," School of Computer and Information Science, University of South Australia, Jan. 2002, retrieved from )http://citeseerx.ist.psu.edu/viewdoc/download?doi=10.1.1.19.4947&rep=rep1&type=pdf, 15 pp.

(Continued)

*Primary Examiner* — William Boddie
*Assistant Examiner* — Carolyn R Edwards
(74) *Attorney, Agent, or Firm* — Shumaker & Sieffert, P.A.

(57) ABSTRACT

In one example, a method includes outputting, at a first location of a presence-sensitive display of a computing device, a first graphical object and receiving an indication of a first touch gesture detected at a second location of the presence-sensitive display. The method may further include, in response to receiving the indication of the first touch gesture, outputting, at the second location, a second graphical object and receiving an indication of a second touch gesture originating within a predetermined distance of the second location and moving towards the first location. The method may further include outputting movement of the second graphical object into contact with the first graphical object. The method may also include, in response to outputting movement of the second graphical object into contact with the first graphical object, outputting at a third location, the first graphical object that is a determined distance away from the first location.

15 Claims, 6 Drawing Sheets

(56) References Cited

OTHER PUBLICATIONS

Saffer, "Designing Gestural Interfaces," O'Reilley Media, Inc., Nov. 2008, retrieved from http://www.designinggesturalinterfaces.com/samples/interactivegestures_ch1.pdf, 43 pp.

Garofalo, User Interfaces for Simultaneous Group Collaboration Through Multi-Touch Devices, Purdue University, Purdue e-Pubs, Jul. 19, 2010, retrieved from http://docs.lib.purdue.edu/cgi/viewcontent.cgi?article=1019&context=techdirproj, 159 pp.

Touch Usability, "News and research on touch interface usability," iPad Nudge Gestures, retrieved from 6) http://www.touchusability.com/blog/2011/6/26/ipad-nudge-gestures.html, accessed on Dec. 8, 2011, 14 pp.

Blog, "The Omni Group—A Nudge Forward—Blog—The Omni Group," retrieved from http://www.omnigroup.com/blog/entry/a_nudge_forward/, Jun. 23, 2011, 4 pp.

Logic Studio, "200+ Workflow Enhancements," Logic Pro 9, retrieved from http://www.apple.com/logicstudio/whats-new/200plus-features.html, accessed on Dec. 8, 2011, 14 pp.

"Manupliate Objects in Pages," iWork Help, retrieved from http://help.apple.com/iwork/1.2/safari/interface/#tan72488ebd, accessed on Dec. 8, 2012, 4 pp.

"Rotate, Flip, Nudge, and match object sized," iWork Help, retrieved from http://help.apple.com/iwork/1.2/safari/interface/#tand51db6c3, accessed on Dec. 8, 2012, 2 pp.

International Search Report and Written Opinion of international application No. PCT/US2013/055209, dated Oct. 1, 2013, 11 pp.

\* cited by examiner

VISUAL OBJECT MANIPULATION

BACKGROUND

Computing devices can provide users with the ability to interact with one or more user interface (UI) elements output at a presence-sensitive display. For instance, some computing devices may allow a user to provide a user input using a presence-sensitive screen. The user input may cause the computing device to modify the execution of processes and/or data of the computing device. Such processes may provide a user with the ability to access the Internet, play games, type document, create and play videos, images and music, as well as providing other various types of functionality. Advancements in computing devices have enabled such devices to provide users with richer user experiences using presence-sensitive displays.

SUMMARY

In one example, a method includes outputting, for display at a first location of a presence-sensitive display of a computing device, a first graphical object. The method also includes receiving, an indication of a first touch gesture detected at a second location of the presence-sensitive display. The first location may be within a predetermined distance of the second location. The method may further include, in response to receiving the indication of the first touch gesture, outputting, for display at the second location of the presence-sensitive display, a second graphical object. The method may also include receiving an indication of a second touch gesture originating within a predetermined distance of the second location and moving towards the first location. The method may further include outputting, for display at the presence-sensitive display, movement of the second graphical object into contact with the first graphical object. The method may also include, in response to outputting movement of the second graphical object into contact with the first graphical object, outputting for display, at a third location of the presence-sensitive display, the first graphical object, the third location being a determined distance away from the first location.

In one example, a computer-readable storage medium is encoded with instructions that, when executed, cause one or more processors of a computing device to perform operations including, outputting, for display at a first location of a presence-sensitive display of the computing device, a first graphical object. The computer-readable storage medium may be further encoded with instructions that, when executed, cause one or more processors of a computing device to perform operations including receiving an indication of a first touch gesture detected at a second location of the presence-sensitive display, wherein the first location does not overlap with the second location. The computer-readable storage medium may be further encoded with instructions that, when executed, cause one or more processors of a computing device to perform operations including, in response to receiving the indication of the first touch gesture, outputting, for display at the second location of the presence-sensitive display, a second graphical object. The computer-readable storage medium may be further encoded with instructions that, when executed, cause one or more processors of a computing device to perform operations including, receiving an indication of a second touch gesture originating within a predetermined distance of the second location and moving towards the first location. The computer-readable storage medium may be further encoded with instructions that, when executed, cause one or more processors of a computing device to perform operations including, outputting for display, at the presence-sensitive display, movement of the second graphical object into contact with the first graphical object. The computer-readable storage medium may be further encoded with instructions that, when executed, cause one or more processors of a computing device to perform operations including, in response to outputting movement of the the second graphical object into contact with the first graphical object, outputting, for display at a third location of the presence-sensitive display, the first graphical object, the third location being a determined distance away from the first location.

In one example, a computing device includes an input device that is operatively coupled to the computing device. The computing device may also include an output device that is operatively coupled to the computing device. The computing device may further include one or more processors. The computing device may also include a memory storing instructions that when executed by the one or more processors cause the one or more processors to output for display, at a first location of the output device, a first graphical object. The one or more processors may also be configured to receive, at the input device, an indication of a first input that indicates a second location of the output device, wherein the first location is within a predetermined distance of the second location. The one or more processors may be further be configured to, in response to receiving the indication of the first input, output, for display at the second location of the output device, a second graphical object. The one or more processors may be further be configured to receive, at the input device, an indication of a second input originating within a predetermined distance of the second location and moving towards the first location. The one or more processors may be further be configured to output, for display at the output device, movement of the second graphical object into contact with the first graphical object. The one or more processors may be further be configured to, in response to outputting movement of the second graphical object into contact with the first graphical object, output, for display the first graphical object at a third location of the output device, the third location being a determined distance away from the first location.

The details of one or more examples of the disclosure are set forth in the accompanying drawings and the description below. Other features, objects, and advantages will be apparent from the description and drawings, and from the claims.

DETAILED DESCRIPTION

In general, this disclosure is directed to techniques for improving user interactions with a presence-sensitive display. Such techniques may improve a user's ability to modify the location and/or orientation of graphical objects displayed by a presence-sensitive display. A presence-sensitive display (e.g., a touch-sensitive screen) may enable a user to interact with graphical objects by detecting user inputs in the form of gestures performed at or near the presence-sensitive display. In some examples, a user may wish to move a graphical object a determined distance, for example, a small distance, by performing one or more gestures at or near the presence-sensitive display. For editing applications that allow a user to move graphical objects to different locations in a presence-sensitive display, a user may find it difficult to move objects small distances (e.g., by single or multiple pixels). Moving objects by very small distances on a presence-sensitive display may be difficult for a user due to the user's finger obscuring the target object. Moreover, in some examples, a user may have difficulty reproducing precise gestures that correspond to small distances on the presence-sensitive display.

Techniques of the present disclosure may improve the ease with which a user can change the location and/or orientation of a graphical object. Using techniques of the disclosure, a user may, instead of tapping on a target graphical object and dragging the user's finger on the screen to move the object, select a location of the presence-sensitive display that is next to the target graphical object. A temporary graphical object may then appear in response to selecting the location next to the target graphical object. The user can then drag this temporary graphical object into visual contact with the target graphical object. Such contact may move the target graphical object according to a determined distance. By displaying the temporary graphical object, the user's finger may not obstruct the target graphical object that the user desires to move. Moreover, by determining a determined distance associated with the gesture, techniques of the disclosure enable the user to precisely move the target graphical object by a small distance.

Figure 1:
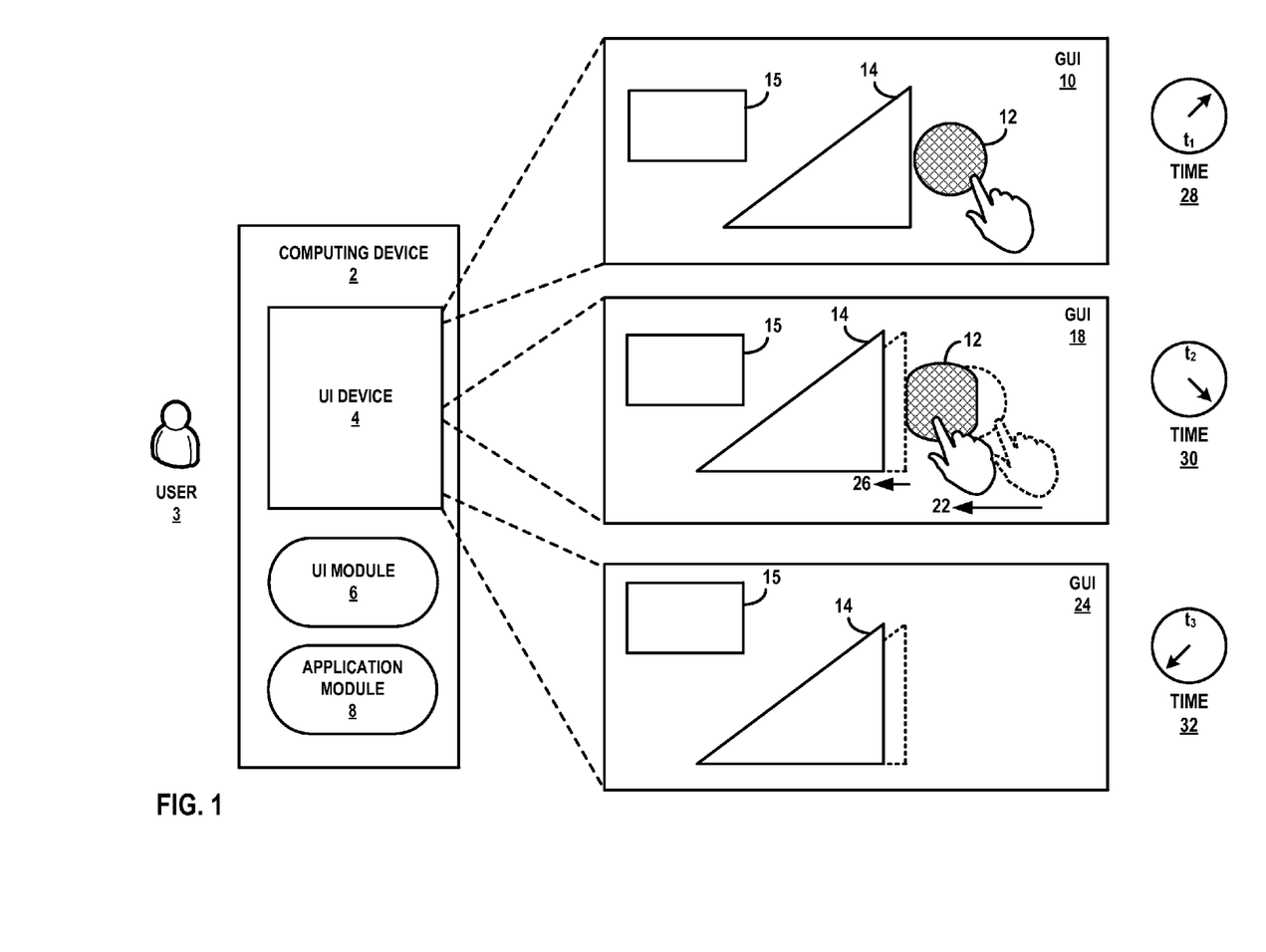
FIG. 1 is a block diagram illustrating an example computing device that may be used to display graphical objects and improve the ease of moving graphical objects determined distances, in accordance with one or more techniques of the present disclosure.

FIG. 1 is a block diagram illustrating an example computing device 2 that may be used to display graphical objects and improve the ease of moving graphical objects determined distances, in accordance with one or more techniques of the present disclosure. In some examples, computing device 2 may be associated with user 3. A user associated with a computing device may interact with the computing device by providing various user inputs to the computing device. In some examples, user 3 may have one or more accounts with one or more services, such as a social networking service and/or telephone service, and the accounts may be registered with computing device 2, which is associated with user 3.

Examples of computing device 2 may include, but are not limited to, portable or mobile devices such as mobile phones (including smart phones), laptop computers, desktop computers, tablet computers, smart television platform, personal digital assistants (PDAs), servers, mainframes, etc. As shown in the example of FIG. 1, computing device 2 may be a tablet computer. Computing device 2, in some examples, can include a user interface (UI) device 4, UI module 6, and application module 8. Other examples of a computing device 2 that implement techniques of the disclosure may include additional components not shown in FIG. 1.

Computing device 2 may include UI device 4. In some examples, UI device 4 is configured to receive tactile, audio, or visual input. Examples of UI device 4, as shown in FIG. 1, may include a touch-sensitive and/or a presence-sensitive display or any other type of device for receiving input. UI device 4 may output content such as graphical user interface (GUI) 10, GUI 18, and GUI 24 for display. In the example of FIG. 1, UI device 6 may be a presence-sensitive display that can display a graphical user interface and receive input from a user using capacitive or inductive detection at or near the presence sensitive display.

As shown in FIG. 1, computing device 2 may include user interface (UI) module 6. UI module 6 may perform one or more functions to receive input, such as user input or network data, and send such input to other components associated with computing device 2, such as application module 8. UI module 6 may also receive data from components associated with computing device 2, such as application module 8. Using the data, UI module 6 may cause other components associated with computing device 2, such as UI device 4, to provide output based on the data. For instance, UI module 6 may receive data from application module 8 that causes UI device 4 to display GUIs 10, 18, and 24.

Computing device 2, in some examples, includes one or more application modules 8. Application module 8 may include functionality to perform any variety of operations on computing device 2. For instance, application module 8 may include a word processor, spreadsheet, web browser, multimedia player, server application, operating system, distributed computing application, graphic design application, video editing application, web development application, etc. As described in the example of FIG. 1, application module 8 may include functionality of a graphic design application that displays graphical content including graphical objects. Application module 8 may further enable user 3 to create and modify graphical content in response to receiving user inputs via UI device 4. For example, application module 8 may cause UI device 4 to display graphical objects 14 and 15. In response to receiving user input, application module 8 may create and or modify graphical content included in GUIs 10, 18, and/or 24.

As shown in FIG. 1, GUIs 10, 18, and 24 may be user interface generated by application module 8 that allows user 3 to interact with computing device. GUIs 10, 18, and 24 may include graphical content. Graphical content, generally, may be any visually displayable graphical object of a graphical user interface. Examples of graphical content may include text, images, a group of moving images, etc. Such examples may include a picture, hyperlink, animation, video, characters of a character set etc. As shown in FIG. 1, graphical content may include graphical objects 14 and 15. For purposes of illustration in FIG. 1, graphical objects 14 and 15 may be images included in graphic content file. UI module 6 may cause UI device 4 to display graphical object 12 in accordance with techniques of the present disclosure further described herein. In some examples, graphical object 12 may be an image. Graphical object 12, in some examples, may be a spherically or circular shaped image.

Techniques of the present disclosure may improve the ease with which a user can change the location and/or orientation of graphical objects. Using techniques of the disclosure, a user may, instead of selecting a target graphical object with a gesture that obstructs the view of the graphical object, select a location of the presence-sensitive display that is next to the target graphical object. A temporary graphical object may then appear in response to selecting the location next to the target graphical object. The user can then drag this temporary graphical object into visual contact with the target graphical object. Such contact may move the target graphical object according to a determined distance. By displaying the temporary graphical object next to the target graphical object, the user's finger may not obstruct the target graphical object that the user desires to move. Moreover, by determining a determined distance associated with the gesture, techniques of the disclosure enable the user to precisely move the target graphical object by a small distance. Furthermore, in some examples, techniques of the disclosure may enable a user to initiate the display of the temporary graphical object and the movement of the temporary and target graphical objects using a single selection finger, rather than performing simultaneous gestures using multiple fingers, to move the target object.

As shown in the example of FIG. 1, application module 8 may cause UI device 4 to display graphical user interface (GUI) 10. GUI 10 may initially include graphical objects 14 and 15. Consequently, application module 8 may cause UI device 4 to display graphical object 14 at a first location of UI device 4. As shown in FIG. 1, graphical object 15 is shown at a different location of UI device 4.

User 3 may desire to move graphical object 14 a small distance towards graphical object 15 in GUI. In some examples, a small distance may include a distance of one pixel or, in another examples, a small distance may include multiple pixels. In any case, user 3, in accordance with techniques of the disclosure may perform a gesture at a location next to graphical object 14. As shown in FIG. 1, the location at which user 3 performs the gesture does not result in the hand and/or finger of user 3 to overlap with graphical object 14. In one example, the gesture may be a tap gesture in which user 3's finger moves into proximity with UI device 4 such that the finger is temporarily detected by UI device 4 and then user 3's finger moves away from UI device 4 such that the finger is no longer detected. In a different example, user 3 may move his/her finger into proximity with UI device 4 such that the finger is detectable by UI device 4. In this example, user 3 may maintain his/her finger in proximity to UI device 4 to perform subsequent motions before removing the finger from proximity to UI device 4 such that the finger is no longer detectable.

When user 3 performs the gesture, UI module 6 may receive an indication of a gesture detected at a second location of the presence-sensitive display. As shown in FIG. 1, the location of the gesture performed by user 3 may be within a predetermined distance of the second location at time 28. In some examples, user 3 may initially set the predetermined distance by providing an input value that UI module 6 receives. In another example, UI module 6 may include a default predetermined distance that UI module 6 uses if no value is supplied by user 3. In some examples, the location of the touch gesture performed by user 3 may not overlap with the location of graphical object 14.

In some examples, if UI module 6 determines the location of the gesture is not within the predetermined distance of the location of graphical object 14, UI module 6 may ignore the gesture or perform some other action not related to displaying graphical object 12. If however, UI module 6 determines that the location of the gesture is within the predetermined distance of the location of graphical object 14, UI module 6 may display graphical object 12. Consequently, in the example of FIG. 1, UI module 6 may, in response to determining the gesture, display, the location of the presence-sensitive display where the gesture was detected, graphical object 12. As shown in FIG. 1, UI module 6 causes UI device 4 to display graphical object 12 at a location that is next to graphical object 14. In the current example, the finger of user 3 may remain detectable by UI device 4 (e.g., user 3 may not remove his/her finger from the presence-sensitive display). In other examples, user 3 may remove his/her finger from the display and graphical object 12 may remain displayed by UI device 4.

In some examples, graphical object 12 may be an image. In one example, the image may be a visual representation of a photo. In other examples, the image may be a visual representation of an object generated in a graphic content application. In other examples, graphical object 12 may be a video or any other object that that UI device 4 may display.

As shown in FIG. 1, at time 30 which occurs after time 28, user 3 (whose finger remains at or near UI device 4 such that it is detectable by UI device 4) may perform a gesture originating from the location of UI device 4 that display graphical object 12 towards graphical object 14. For example, user 3 may perform a swipe gesture to move user 3's finger moves laterally towards graphical object 14. In response to UI module 6 determining that user 3 is performing the gesture, UI module 6 may cause UI device 4 to display movement of graphical object 12 into visual contact with graphical object 14.

In some examples, when UI device 4 displays graphical object 12 moving into visual contact with graphical object 14, UI module 6 may cause a change in a visual appearance of graphical object 12. For example, UI module 6 may cause the visual appearance of display object 12 to distort. The distortion in some examples may simulate a physical collision between two objects. In this way, the change in visual appearance of graphical object 12 may assist user 3 in determining that visual contact between graphical object 12 and graphical object 14 has occurred.

In response to outputting movement of graphical object 12 visually contacting with graphical object 14, UI module 6 may cause UI device 4 to display graphical object 14 at a new location that is a determined distance 26 away from the previous location of graphical object 14 prior to coming into visual contact with graphical object 12. In the example of FIG. 1, the gesture performed by user 3 may travel a distance 22. UI module 4 may determine distance 22 and may further determine distance 26. Distance 26, in some examples, may be a distance that is proportional to distance 22 (e.g., the distance traveled by user 3's finger across UI device 4). In other examples, distance 26 may not be proportional to distance 22. In such examples where distance 26 is not proportional to distance 22, user 3 is thereby enabled to "nudge" graphical object 14 by causing graphical object 12 to visual contact with graphical object 14.

In the example of FIG. 1, distance 26 may not be proportional to distance 22. Consequently, in one example, distance 26 may be equal to a predetermined distance that is not based on the length of distance 22. For instance, distance 26 may be equal to one pixel value. In other examples, distance 26 may be equal to multiple pixel values. Distance 26 may be equal to a default value specified by UI module 6 or alternatively may be provided by user 3. In any case, when UI module 6 determines user 3 has performed the gesture, UI module 6 may cause UI device 4 to display graphical object 14 at a new location that is distance 26 away from the previous location of graphical object 14. In some examples, and as shown in FIG. 1, UI module 6 may cause UI device 4 to display graphical object 14 at a location that is distance 26 away from the previous location and in a direction that the gesture is performed. For example, as shown in FIG. 1, user 3 performs the gesture from right to left in GUI 18, and UI module 6 moves, by distance 26, graphical object 14 to a new location that is to the left of the previous location of graphical object 14. As shown in FIG. 1, at time 32 which occurs after time 30, UI device module 6 causes UI device 4 to display graphical object 14 at the new location that is distance 26 to the left of the original location at which graphical object 14 was displayed.

In some examples, the change in physical appearance of graphical object 12 and/or distance 26 may be based on one or more physical simulations. For instance, UI module 6 may associate one or more properties with physical object 12 and/or graphical object 14 that indicate simulated density, mass, composition, etc. In some examples, UI module 6 may define one or more physical simulations that UI module 6 can apply to graphical objects 12 and 14 when the objects come into visual contact with one another. For instance, a physical simulation may simulate elasticity of a spring, elastics, pillow, etc., such that when graphical objects 12 and 14 come into visual contact with one another, UI module 6 can apply the defined physical simulation. In some examples, the physical simulation may change based on properties of user 3's gesture, such as velocity, distance, etc. of the gesture.

In some examples, UI module 6 may remove graphical object 12 from display when user 3's finger is no longer detectable at UI device 4. For instance, the gesture of user 3 to move graphical object 12 towards graphical object 14 may include a motion of an input unit (e.g., a finger, stylus, etc.). The input unit may be detectable by UI device 4 while the input unit is at least at or near UI device 4. In some examples, the input unit may be near UI device 4 when the input unit is detectable by UI device 4 using capacitive, inductive, optical, or other suitable detection techniques. In the current example, in response to UI module 6 determining that the input unit is no longer detectable by UI device 4, UI module 6 may remove graphical object 12 from display. In other examples, UI module 6 may remove graphical 12 from display in response to receiving a separate gesture at UI device 4.

Figure 2:
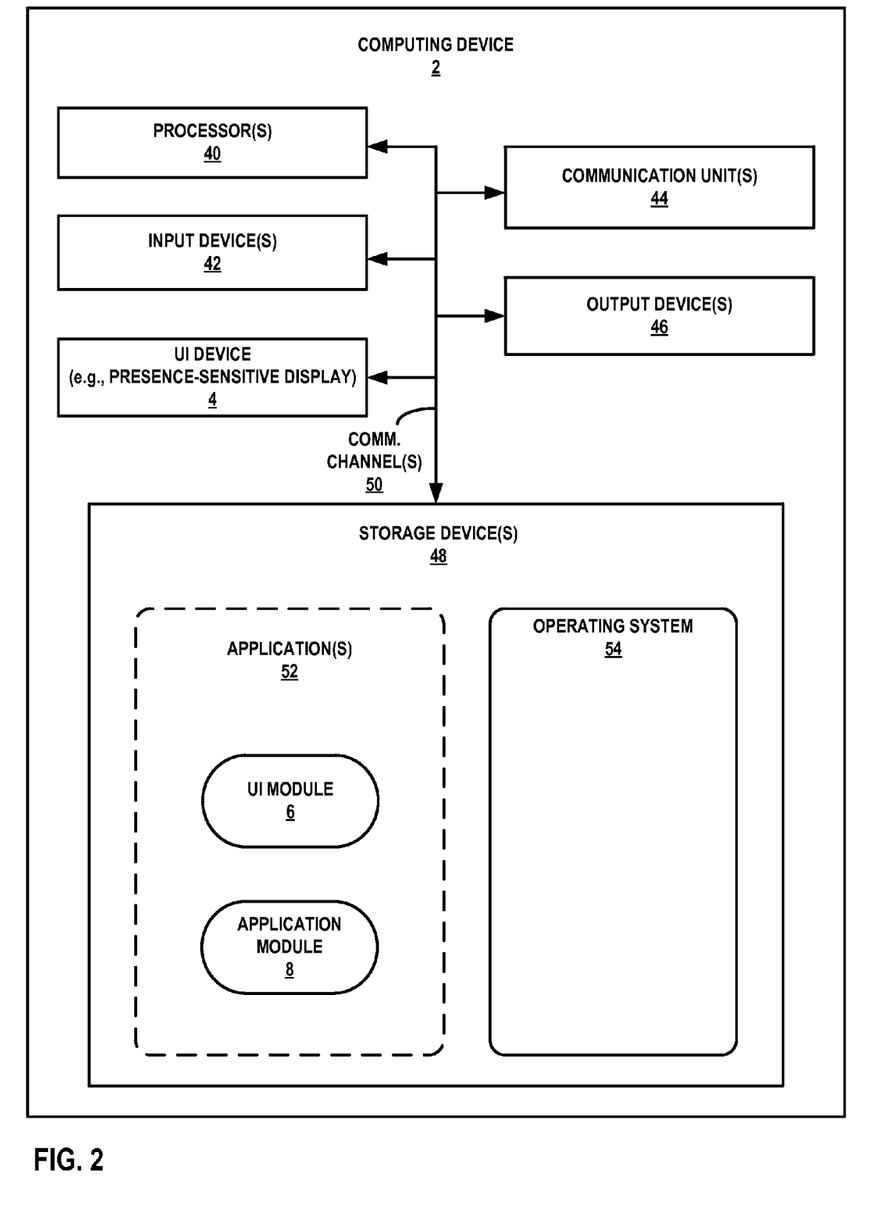
FIG. 2 is a block diagram illustrating further details of one example of a computing device shown in FIG. 1, in accordance with one or more aspects of the present disclosure.

FIG. 2 is a block diagram illustrating further details of one example of a computing device shown in FIG. 1, in accordance with one or more aspects of the present disclosure. FIG. 2 illustrates only one particular example of computing device 2, and many other examples of computing device 2 may be used in other instances.

As shown in the specific example of FIG. 2, computing device 2 includes one or more processors 40, one or more input devices 42, one or more communication units 44, one or more output devices 46, one or more storage devices 48, and user interface (UI) device 4. Computing device 2, in one example, further includes applications 52 and operating system 54 that are executable by computing device 2. Each of components 40, 42, 44, 46, and 48 may be interconnected (physically, communicatively, and/or operatively) for inter-component communications. In some examples, communication channels 50 may include a system bus, network connection, interprocess communication data structure, or any other channel for communicating data. As one example in FIG. 2, components 40, 42, 44, 46, and 48 may be coupled by one or more communication channels 50. Applications 52 (including modules 6 and 8) and operating system 54 may also communicate information with one another as well as with other components in computing device 2.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., applications 48) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 44 to wirelessly communicate with an external device such as computing devices 4 of FIG. 1, or any other computing device.

Computing device 2, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user. In some examples, UI device 4 may include functionality of input device 42 and/or output device 46. In the example of FIG. 2, UI device 6 may be a touch-sensitive screen.

Computing device 2 may include operating system 54. Operating system 54, in some examples, controls the operation of components of computing device 2. For example, operating system 54, in one example, facilitates the communication of applications 52 with processors 40, communication unit 44, storage device 48, input device 42, and output device 46. As shown in FIG. 2, applications 52 may include UI module 6 and application module 8, as described in FIG. 1. Applications 52 may each include program instructions and/or data that are executable by computing device 2. As one example, UI module 6 may include instructions that cause computing device 2 to perform one or more of the operations and actions described in the present disclosure.

In accordance with techniques of the disclosure, application module 8 may initially cause UI device 4 to display a graphical user interface that includes graphical objects, such as GUI 10 shown in FIG. 1. In accordance with techniques of the disclosure, user 3 may perform a touch gesture at a location of UI device 4 that displays graphical object 14. UI device 4 may detect the touch gesture and, in response, UI module 6 may determine whether the touch gesture is within a predetermined distance of graphical object 14. If the touch gesture is not within the predetermined distance of graphical object 14, UI module 6 may ignore the gesture or perform a different operation that is not related the techniques of this disclosure.

If, however, the touch gesture is within the predetermined distance of graphical object 14, UI module 6 may cause UI device 4 to display graphical object 12 at a location of UI device 4 that corresponds to the touch gesture. User 3, upon seeing that UI device 4 now displays graphical object 12, may perform a gesture (e.g., a swipe gesture) to move his/her finger towards graphical object 14. By moving his/her finger, user 3 can simulate moving the graphical object 12 into visual contact with graphical object 14 to change the location of graphical object 14. By "bumping" or "nudging" graphical object 12 into graphical object 14 with a touch gesture, user 3 can move graphical object 14 in the graphical user interface.

In accordance with techniques of the disclosure, when user 3 performs the touch gesture, UI module 6 may cause UI 4 device 4 to graphical object 12 moving towards graphical object 14. When the border of graphical object 12 comes into visual contact with the border of graphical object 14, UI module 6 may cause UI device 4 to display graphical object 14 a determined distance away from the original location of graphical object 14. For instance, the determined distance may be two pixels. Consequently, graphical object 14 may be moved two pixels away from the original location of graphical object 14, and to the new location which is in the direction that the gesture was performed (e.g., right-to-left).

In some examples, UI module 6 may increase the magnitude of the determined distance by a distance factor based at least in part on distance that graphical object 12 overlaps with graphical object 14 (as shown in FIG. 1). For instance, UI module 6 may determine a distance (e.g., an overlap distance), that graphical module 12 overlaps with graphical object 14. In some examples, UI module 6 may determine the overlap distance as a distance that the border of graphical object 12 overlaps with the location of graphical object 14. If UI module 6 determines that the overlap distance is greater than a threshold distance, UI module 6 may increase the determined distance by a distance factor. In some examples, the distance factor and/or threshold distance may be set by user 3 or may alternatively be default value set by UI module 6. The distance factor and/or threshold distance may be numerical values determined and/or stored by UI module 6 in some examples. In some examples, UI module 6 may determine the distance factor in proportion to the overlap distance, such that as the overlap distance increases, UI module 6 increases the distance factor that is applied to the determined distance.

In some examples, UI module 6 may enable user 3 to drag graphical object 14 to any new location of UI device 4. For instance, UI module 6 may determine a distance (e.g., an overlap distance), that graphical module 12 overlaps with graphical object 14. In some examples, UI module 6 may determine the overlap distance as a distance that the border of graphical object 12 overlaps with the location of graphical object 14. If UI module 6 determines that the overlap distance is greater than a threshold distance, user 3 may move graphical module 14 to any new location of UI device 4. In some examples, UI module 6 may cause graphical object 12 and graphical object 14 to move together to each location of UI device 4 that correspond to user 3's finger. Once user 3 has moved his/her finger to the desired location of UI device 4, user 3 may remove his/her finger and UI module 6 may cause UI device 4 to display graphical object 14 at the last detectable location of UI device 4 at which user 3's finger was detectable before user 3's finger became no longer detectable (e.g., when user 3 removed his/her finger from detection by UI device 4). In some examples, the distance factor and/or threshold distance may be set by user 3 or may alternatively be default value set by UI module 6. The distance factor and/or threshold distance may be numerical values determined and/or stored by UI module 6 in some examples.

Figure 3:
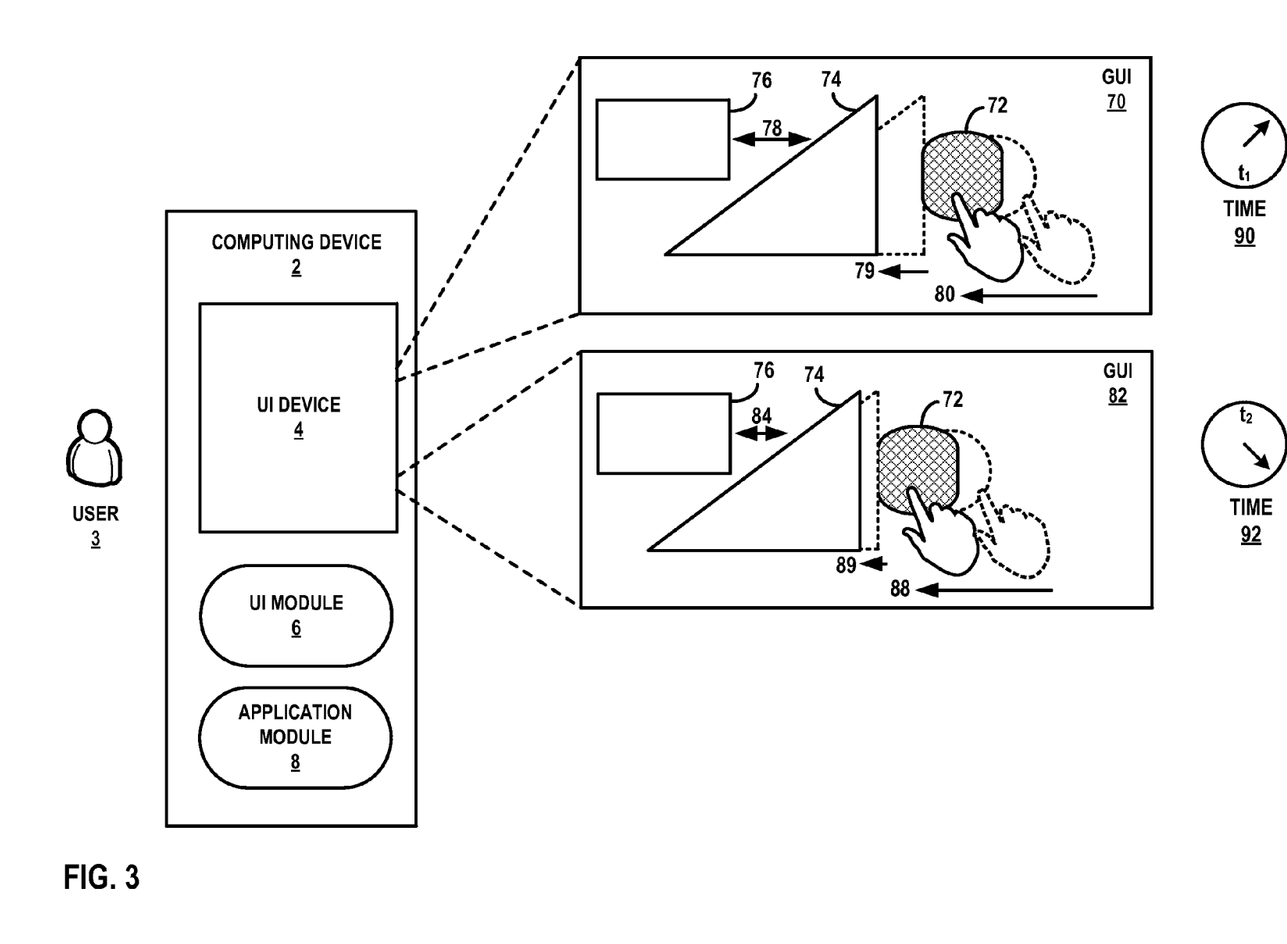
FIG. 3 is a block diagram illustrating an example computing device that may be used to display graphical objects and improve the ease of moving graphical objects determined distances, in accordance with one or more techniques of the present disclosure.

FIG. 3 is a block diagram illustrating an example computing device 2 that may be used to display graphical objects and improve the ease of moving graphical objects determined distances, in accordance with one or more techniques of the present disclosure. As shown in FIG. 3, computing device 2 includes components, such as UI device 4 (which may be a touch-sensitive screen), UI module 6, and application module 8. Components of computing device 2 can include functionality similar to functionality of such components as described in FIGS. 1 and 2.

In some example techniques, UI module 6 may change the determined distance as one graphical object is moved towards another graphical object. For instance, as the distance between two graphical objects decreases, UI module 6 may reduce the determined distance thereby providing for more granular movements of a graphical object as it moves to towards another graphical object. Such techniques are further illustrated in FIG. 3.

As shown in FIG. 3, GUI 70 initially includes graphical objects 74 and 76. Beginning at time 90, user 3 may perform a gesture (e.g., a tap gesture) at a location within a predetermined distance of the location of graphical object 74. In response to determining the gesture, UI module 6 may cause UI device 4 to display graphical object 72. User 3 may then perform a gesture (e.g., a swipe gesture traversing a distance 80) such that UI module 6, upon detecting the gesture, causes UI device 4 to display graphical 72 moving towards graphical object 74. UI module 6 may cause UI device 4 to display graphical object 72 coming into visual contact with graphical object 74.

In response to UI device 4 detecting the touch gesture originating at the location of GUI 70 that includes graphical object 72 and moving towards the location of GUI 70 that includes graphical object 74, UI module 6 may determine a distance 78 between the location of graphical object 76 and the location of graphical object 74. In some examples, the distance between the locations may be a distance between a point on the border of graphical object 74 and a point on the border of graphical object 76. In some examples, the distance may be the shortest distance between a point on the border of graphical object 74 and a point on the border of graphical object 76. Upon determining distance 78, UI module 6 may determine distance 79. UI module 6 may determine distance 79 as a distance that is proportional to the distance between the locations of graphical objects 74 and 76. For instance, in one example, the magnitude of distance 79 may be larger when distance 78 is larger, and conversely, UI module 6 may determine the magnitude of 79 to be smaller when distance 78 is smaller. In this way, and as further illustrated in FIG. 3, UI module 6 may decrease the magnitude of the distance that graphical object 74 moves as graphical object 74 is moved closer to graphical object 76.

In the current example, UI module 6 may cause UI device 4 to display graphical object 74 at a new location that is distance 79 from the previous location of graphical object 74, as described above. At time 92, which occurs after time 90, user 2 may perform a subsequent gesture (e.g., a swipe gesture traversing a distance 88) similar to the gesture previously described at time 90. Again, UI module 6 may cause UI device 4 to display graphical object 72 moving towards graphical object 74 as shown in GUI 82. In response to receiving the gesture, UI module 6 may determine a distance 84 between graphical object 76 and graphical object 74. Using distance 84, UI module 6 may determine a distance 89 to move graphical object 74 that is proportional to distance 84. Consequently, as illustrated in FIG. 3, distance 84 is less than distance 78 as shown in GUI 70, and therefore UI module 6 may determine distance 89 to be less than distance 79. Once UI module 6 has determined distance 89, UI module 6 may cause UI device 4 to display graphical object 74 distance 79 away from the previous location of graphical object 74. In this way, as user 3 performs multiple gestures to use graphical object 72 to "nudge" or "bump" graphical object 74 towards graphical object 76, UI module 6 can modify the magnitude (e.g., length) of the determined distance that UI module 6 moves graphical object 74. Conversely, in a different example, if user 3 performed multiple gestures to nudge graphical object 74 away from graphical object 76, UI module 6 may increase the magnitude of the determined distance at which UI module 6 causes graphical object 74 to move away from graphical object 76. In other examples, UI module 6 may not proportionally change the magnitude of the determined distance as graphical object 74 moves in away from (e.g., in an opposite direction) from graphical object 76.

Figure 4:
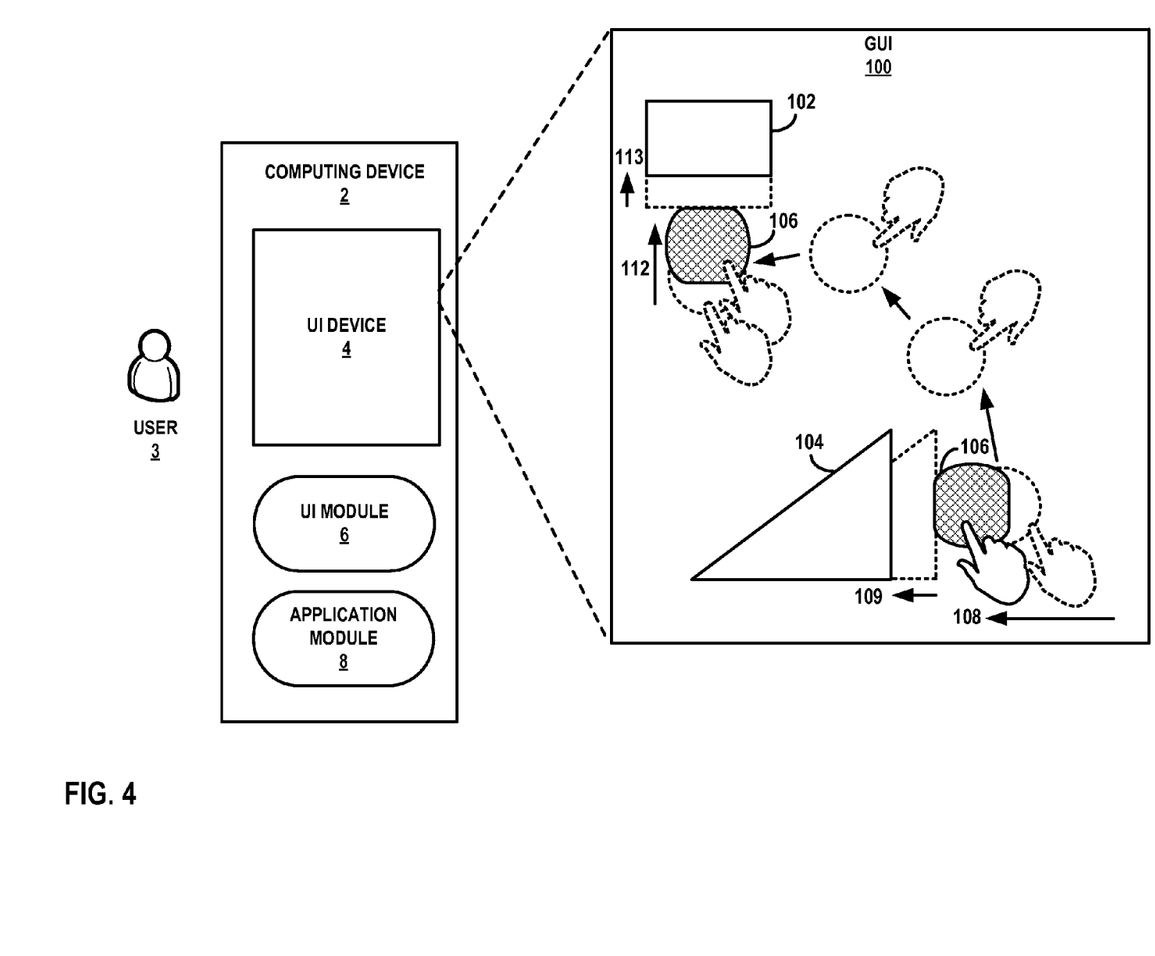
FIG. 4 is a block diagram illustrating an example computing device that may be used to display graphical objects and improve the ease of moving graphical objects determined distances, in accordance with one or more techniques of the present disclosure.

FIG. 4 is a block diagram illustrating an example computing device 2 that may be used to display graphical objects and improve the ease of moving graphical objects determined distances, in accordance with one or more techniques of the present disclosure. As shown in FIG. 4, computing device 2 includes components, such as UI device 4 (which may be a touch-sensitive screen), UI module 6, and application module 8. Components of computing device 2 can include functionality similar to functionality of such components as described in FIGS. 1 and 2.

In some examples, techniques of the disclosure may enable user 3 to "bump" or "nudge" multiple objects using a graphical object. For instance, user 3 may wish to nudge multiple objects without removing his/her finger from detection by UI device 4. Techniques of the disclosure may enable user 3 to move a graphical object to different locations in GUI 100 and use the graphical object to nudge multiple different graphical objects to different locations of GUI 100.

As shown in FIG. 3, GUI 100 may initially include graphical objects 102 and 104. User 3 may move both graphical object 102 and graphical object 104 without removing his/her finger from detection by UI device 4. Consequently, user 3 may perform a gesture (e.g., a tap gesture) at a location within a predetermined distance of the location of graphical object 104. In response to determining the gesture, UI module 6 may cause UI device 4 to display graphical object 106. User 3 may then perform a gesture (e.g., a swipe gesture traversing a distance 108) such that UI module 6, upon detecting the gesture, causes UI device 4 to display graphical object 106 moving towards graphical object 104. UI module 6 may cause UI device 4 to display graphical object 106 coming into visual contact with graphical object 104.

In response to displaying graphical object 106 contacting with graphical object 104, UI module 6 may cause UI device 4 to display graphical object 104 at a new location of UI device 4 that is a determined distance 109 away from the initial location of UI device 4. User 3 may, without removing his/her finger from GUI 100, continue to perform a gesture that moves his/her finger towards graphical object 102. Consequently, UI module 6, in response to determining the gesture, may cause UI device 4 to display graphical object 106 moving towards graphical object 102 as user 3 moves his/her finger. In some examples, graphical object 106 follows the path of user 3's finger as detected by UI device 4.

User 3 may move his/her finger along the path towards graphical object 102 without removing his/her finger from detection by UI device 4. User 3 may continue the gesture such that UI module 6 causes UI device 4 to display graphical object 106 visual contacting with graphical object 102. In the example of FIG. 4, a portion of the gesture may traverse a distance 112 upward in GUI 100. In response to UI module 6 causing UI device 4 to display graphical object 106 visually contacting with graphical object 102, UI module 6 may further cause UI device 4 to display graphical object 102 at a new location that is a determined distance 113 away from the original location of graphical object 102. User 3 may subsequently remove his/her finger from UI device 4 such that the finger is no longer detectable by UI device 4. As described in the example of FIG. 4, the gestures performed by user 3 from initially detecting user 3's finger to when user 3's finger is removed, which terminates the gestures, may be performed successively without removing the finger from detection by UI device 4. In this way, user 3 can move multiple objects in determined distances by moving graphical object 106 to different locations in GUI 100. While examples of the disclosure describe a finger as being detectable by UI device 4, any input unit such as a finger, stylus, pen or other input device may be used to perform techniques of the disclosure.

Figure 5:
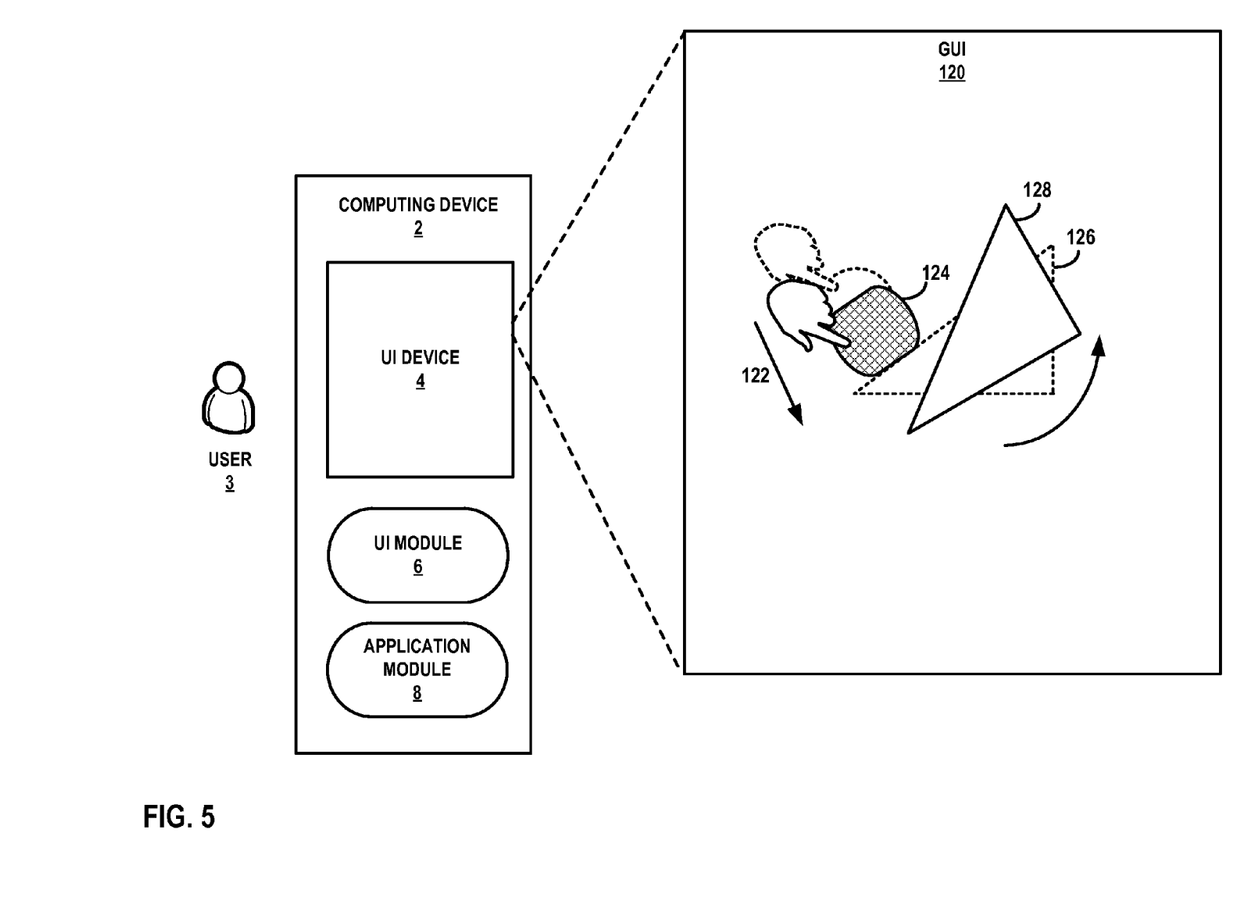
FIG. 5 is a block diagram illustrating an example computing device that may be used to display graphical objects and improve the ease of moving graphical objects determined distances, in accordance with one or more techniques of the present disclosure.

FIG. 5 is a block diagram illustrating an example computing device 2 that may be used to display graphical objects and improve the ease of moving graphical objects determined distances, in accordance with one or more techniques of the present disclosure. As shown in FIG. 5, computing device 2 includes components, such as UI device 4 (which may be a touch-sensitive screen), UI module 6, and application module 8. Components of computing device 2 can include functionality similar to functionality of such components as described in FIGS. 1 and 2.

In some examples, techniques of the disclosure may enable user 3 to "bump" or "nudge" a graphical object such that an orientation of a graphical object changes. For instance, user 3 may wish to rotate a graphical object by a small distance by nudging the graphical object. As shown in FIG. 5, GUI 120 may initially include graphical objects 128. Graphical object 128 may be initially displayed by UI device 4 at an orientation 126. If user 3 wishes to change the orientation of graphical object 128 (e.g., rotate graphical object 128), user 3 may initially perform a gesture (e.g., a tap gesture) at a location within a predetermined distance of the location of graphical object 128. In response to determining the gesture, UI module 6 may cause UI device 4 to display graphical object 124. User 3 may then perform a gesture (e.g., a swipe gesture traversing a distance 122) such that UI module 6, upon detecting the gesture, causes UI device 4 to display graphical object 124 moving towards graphical object 128. UI module 6 may cause UI device 4 to display graphical object 124 coming into visual contact with graphical object 128.

In response to displaying graphical 124 coming into visual contact with graphical object 128, UI module 6 may cause UI device 4 to determine an orientation of graphical object 128 that is different from the original orientation of graphical object 128. In some examples, UI module 6 may determine the orientation based on one or more properties of the gesture as graphical object 124 comes into visual contact with graphical object 128. Such properties may include the velocity at which graphical object 124 comes into visual contact with graphical object 128, the location at which graphical object 124 comes into visual contact with graphical object 128, etc. Consequently, a determined radial distance traveled by graphical object 128 may be based on one or more such properties. In other examples, the determined radial distance (e.g., one pixel or multiple pixels) at which graphical object 128 is rotated is equal to a predetermined distance that may be a default value of UI module 6 or set by user 3. In response to receiving the gesture and determining the orientation, UI module 6 may cause UI device 4 to display graphical object 128 at the new, determined orientation that is different from the previous orientation before graphical object 128 was visually contacted by graphical object 124. In some examples, UI module 6 may cause UI device 4 to display graphical object 128 as rotating to the new, determined orientation. As shown in FIG. 5, graphical object 128 is shown as rotated to a new orientation.

Figure 6:
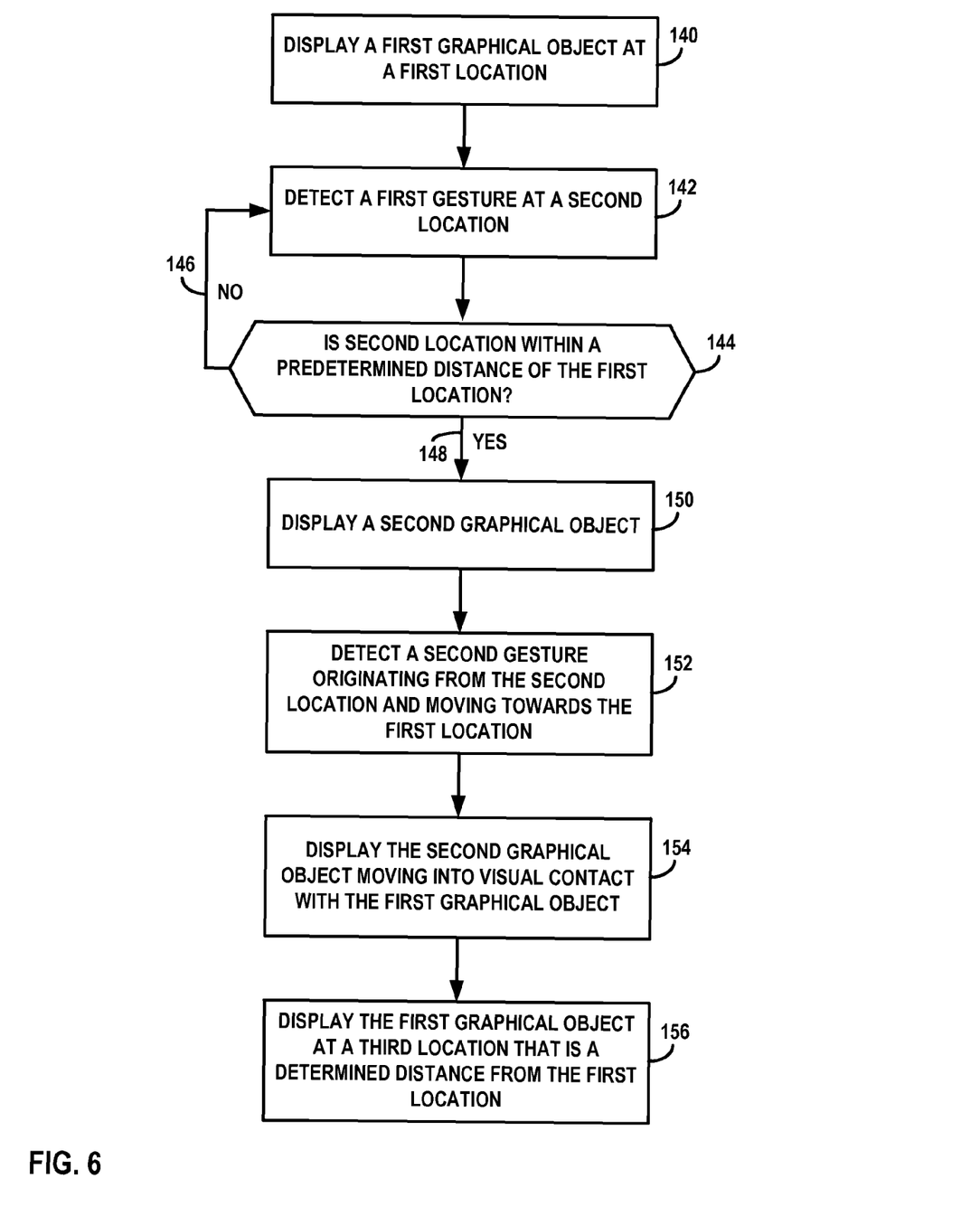
FIG. 6 is a flow diagram illustrating example operations of a computing device to display graphical objects and improve the ease of moving graphical objects determined distances, in accordance with one or more techniques of the present disclosure.

FIG. 6 is a flow diagram illustrating example operations of a computing device to display graphical objects and improve the ease of moving graphical objects determined distances, in accordance with one or more techniques of the present disclosure. For purposes of illustration only, the example operations are described below within the context of computing device 2, as shown in FIGS. 1 and 2.

In the example of FIG. 6, computing device 2 may initially display a first graphical object at a first location of a presence-sensitive display of computing device 2 (140). Computing device 2 may subsequently detect a first gesture at a second, different location of the presence-sensitive display (142). In response to detecting the first touch gesture, computing device 2 may determine whether the second location is within a predetermined distance of the first location (144). If the second location is not within a predetermined distance of the first location, computing device 2 may ignore the gesture or perform some other action not related to techniques of this disclosure (146).

If the second location is within a predetermined distance of the first location (148), computing device 2 may display a second graphical object at the second location (150). Computing device 2 may subsequently detect a second gesture originating from the second location and moving towards the first location (152). Computing device 2, upon detecting the gesture, may display the second graphical object moving into visual contact with the first graphical object (154). Computing device 2 may subsequently display the first graphical object at a third location that is a determined distance from the first location (156). In this way, a user may move the first graphical object the determined distance.

In one example, wherein the determined distance is not proportional to a distance between the first location and the second location. In another example, the determined distance is proportional to a distance between the first location and the second location. In one example, the operations include determining, by the computing device, a beginning location of the second touch gesture at the presence-sensitive display, wherein second touch gesture originates at the beginning location; determining, by the computing device, an ending location of the second touch gesture at the presence-sensitive display, wherein second touch gesture terminates at the ending location; determining, by the computing device, a distance between the beginning location and the ending location; and determining, by the computing device, the determined distance based at least in part on the distance between the beginning location and the ending location.

In one example, the operations include determining, by the computing device, a beginning location of the second touch gesture at the presence-sensitive display, wherein second touch gesture originates at the beginning location; determining, by the computing device, an ending location of the second touch gesture at the presence-sensitive display, wherein second touch gesture terminates at the ending location; determining, by the computing device, a distance between the beginning location and the ending location; and determining, by the computing device, the determined distance based at least in part on the distance between the beginning location and the ending location.

In one example, the operations include receiving, by the computing device, an input value comprising a distance value; and determining, by the computing device, that the determined distance is equal to the input value. In one example, the first graphical object is an image; and the second graphical object is a spherically shaped image. In one example, the operations may include determining, by the computing device, a first visual appearance associated with the second graphical object; determining, by the computing device, the second graphical object is displayed contacting with the first graphical object; and displaying, by the computing device the second graphical object to indicate a second visual appearance that is different than the first visual appearance.

In one example, the operations include determining, by the computing device, whether the first location is within a predetermined distance of the second location; if the first location is not within a predetermined distance of the second location, refraining from displaying, at the presence-sensitive display of the computing device, the second graphical object. In one example, the operations include displaying, at a fourth location of the presence-sensitive display of the computing device, a third graphical object; in response to receiving, at the presence-sensitive display, the second touch gesture originating within a predetermined distance of the second graphical object and moving towards the second location, determining, by the computing device, a distance between the third location and the fourth location; and determining, by the computing device, the determined distance proportionally to the distance between the third location and the fourth location.

In one example, the operations include decreasing, by the computing device, a magnitude of the determined distance as the distance between the third location and the fourth location decreases. In one example, the operations include determining, by the computing device, a first orientation at which the first graphical object is displayed at the presence-sensitive display; in response to displaying the second graphical object contacting with the first graphical object, determining, by the computing device, a second orientation by rotating the first graphical object based at least in part a location of contact between the first and second graphical objects, wherein the first orientation is different than the second orientation; and displaying, at the presence-sensitive display, the first graphical object at the second orientation.

In one example, the operations include displaying, at a fourth location of the presence-sensitive display, a third graphical object; determining, by the computing device, that the second touch gesture further comprises moving towards the fourth location and subsequently into contact with the third graphical object; and in response to displaying the second graphical object contacting with the third graphical object, displaying, the third graphical object at a fifth location of the presence-sensitive display, the fifth location being a second determined distance away from the fourth location.

In one example, the first and second touch gestures comprise motions of an input unit that are detectable by the presence-sensitive display, and the first and second touch gestures are each performed successively without removing the input unit from detection by the presence-sensitive display. In one example, the operations include determining, by the computing device, an overlap distance that the second graphical object overlaps with the first location of the presence-sensitive screen; if the overlap distance is greater than a threshold distance, determining, by the computing device, a distance factor; and increasing, by the computing device, the determined distance by the distance factor.

In one example, the second touch gesture includes a motion of an input unit, wherein the input unit is detectable by the presence-sensitive display while the input unit is at least at or near the presence-sensitive display; and the operations include determining, by the computing device, an overlap distance that the second graphical object overlaps with the first location of the presence-sensitive screen; if the overlap distance is greater than a threshold distance, determining when the input unit is no longer detectable by the presence-sensitive display; and in response to determining that the input unit is no longer detectable by the presence-sensitive display, displaying, by the computing device, the first graphical object at a location of the presence-sensitive display at which the input unit was last detectable before the input unit was subsequently not detected by the presence-sensitive display.

In one example, the second touch gesture includes a motion of an input unit, wherein the input unit is detectable by the presence-sensitive display while the input unit is at least at or near the presence-sensitive display; and the operations include, in response to determining that the input unit is no longer detectable by the presence-sensitive display, removing from display, by the computing device, the second graphical object. In one example, the first location does not substantially overlap with the second location.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
outputting, by a computer device and for display at a first location of a presence-sensitive display, a first graphical object in a graphical user interface;
responsive to receiving an indication of a first touch gesture detected at a second location of the presence-sensitive display, determining, by the computing device, whether the first location is within a first predetermined distance of the second location, the first and second locations included within the graphical user interface;
responsive to determining whether the first location is within the first predetermined distance of the second location:
if the first location is within the first predetermined distance of the second location, outputting, by the computing device and for display at the second location of the presence-sensitive display that corresponds to the first touch gesture, a second graphical object, and
if the first location is not within the first predetermined distance of the second location, refraining from outputting the second graphical object;

while the second graphical object is output for display at the presence-sensitive display:
  responsive to receiving an indication of a second touch gesture originating within a second predetermined distance of the second location and moving towards the first location, outputting, by the computing device and for display at the presence-sensitive display, movement of the second graphical object into contact with the first graphical object, wherein the second touch gesture comprises a motion of an input unit, wherein the input unit is detectable at the presence-sensitive display while the input unit is at least at or near the presence-sensitive display;
  determining, by the computing device, an overlap distance that the second touch gesture overlaps with the first location;
  responsive to determining that the overlap distance is greater than a threshold distance, increasing, by the computing device, a determined distance by a distance factor that is based on the overlap distance;
  responsive to outputting movement of the second graphical object into contact with the first graphical object, outputting, by the computing device and for display at a third location of the presence-sensitive display, the first graphical object, the third location being the determined distance away from the first location; and
responsive to determining that the input unit is no longer detectable at the presence-sensitive display, removing from display, by the computing device, the second graphical object.

2. The method of claim 1 wherein the determined distance is proportional to a distance between the first location and the second location.

3. The method of claim 2, further comprising:
determining, by the computing device, a beginning location of the second touch gesture at the presence-sensitive display, wherein second touch gesture originates at the beginning location;
determining, by the computing device, an ending location of the second touch gesture at the presence-sensitive display, wherein second touch gesture terminates at the ending location;
determining, by the computing device, a distance between the beginning location and the ending location; and
determining, by the computing device, the determined distance based at least in part on the distance between the beginning location and the ending location.

4. The method of claim 3,
increasing, by the computing device, a magnitude of the determined distance as the distance between the beginning location and the ending location increases; and
decreasing, by the computing device, the magnitude of the determined distance as the distance between the beginning location and the ending location decreases.

5. The method of claim 1, further comprising:
receiving, by the computing device, an input value comprising a distance value; and
determining, by the computing device, that the determined distance is based on the input value.

6. The method of claim 1,
wherein the first graphical object is an image, and
wherein the second graphical object is a spherically shaped image.

7. The method of claim 1, further comprising:
determining, by the computing device, a first visual appearance associated with the second graphical object;
determining, by the computing device, the second graphical object is displayed contacting with the first graphical object; and
outputting, for display, the second graphical object to indicate a second visual appearance that is different than the first visual appearance.

8. The method of claim 1, further comprising:
outputting, for display at a fourth location of the presence-sensitive display of the computing device, a third graphical object;
responsive to receiving, at the presence-sensitive display, the indication of the second touch gesture originating within a predetermined distance of the second graphical object and moving towards the second location, determining, by the computing device, a distance between the third location and the fourth location; and
determining, by the computing device, the determined distance proportionally to the distance between the third location and the fourth location.

9. The method of claim 8, wherein determining the determined distance proportionally to the distance between the third location and the fourth location further comprises:
decreasing, by the computing device, a magnitude of the determined distance as the distance between the third location and the fourth location decreases.

10. The method of claim 1, wherein outputting, for display, the third location being a determined distance away from the second location further comprises:
determining, by the computing device, a first orientation at which the first graphical object is displayed at the presence-sensitive display;
responsive to outputting the second graphical object contacting with the first graphical object, determining, by the computing device, a second orientation by rotating the first graphical object based at least in part a location of contact between the first and second graphical objects, wherein the first orientation is different than the second orientation; and
outputting, for display at the presence-sensitive display, the first graphical object at the second orientation.

11. The method of claim 1, wherein the determined distance is a first determined distance, the method further comprising:
outputting, for display at a fourth location of the presence-sensitive display, a third graphical object;
determining, by the computing device, that the second touch gesture further comprises moving towards the fourth location and subsequently into contact with the third graphical object; and
responsive to outputting the second graphical object contacting with the third graphical object, outputting, for display at a fifth location of the presence-sensitive display the third graphical object, the fifth location being a second determined distance away from the fourth location.

12. The method of claim 11,
wherein the first and second touch gestures comprise motions of an input unit that are detectable by the presence-sensitive display, and
wherein the first and second touch gestures are each performed successively without removing the input unit from detection by the presence-sensitive display.

13. The method of claim 1, wherein the second touch gesture comprises a motion of an input unit, wherein the input unit is detectable by the presence-sensitive display while the input unit is at least at or near the presence-sensitive display, the method further comprising:

determining, by the computing device, an overlap distance that the second graphical object overlaps with the first location of the presence-sensitive screen;

responsive to determining that the overlap distance is greater than a threshold distance, determining when the input unit is no longer detectable by the presence-sensitive display; and responsive to determining that the input unit is no longer detectable by the presence-sensitive display, outputting, for display at the presence-sensitive screen and by the computing device, the first graphical object at a location of the presence-sensitive display at which the input unit was last detectable before the input unit was subsequently not detected by the presence-sensitive display.

14. A non-transitory computer-readable storage medium encoded with instructions that, when executed, cause one or more processors of a computing device to perform operations comprising:

outputting, for display at a first location of a presence-sensitive display, a first graphical object in a graphical user interface;

responsive to receiving an indication of a first touch gesture detected at a second location of the presence-sensitive display, determining whether the first location is within a first predetermined distance of the second location, the first and second locations included within the graphical user interface;

responsive to determining whether the first location is within the first predetermined distance of the second location:

if the first location is within the first predetermined distance of the second location, outputting, for display at the second location of the presence-sensitive display that corresponds to the first touch gesture, a second graphical object, and if the first location is not within the first predetermined distance of the second location, refraining from outputting the second graphical object;

while the second graphical object is output for display at the presence-sensitive display:

responsive to receiving an indication of a second touch gesture originating within a second predetermined distance of the second location and moving towards the first location, outputting, for display at the presence-sensitive display, movement of the second graphical object into contact with the first graphical object, wherein the second touch gesture comprises a motion of an input unit, wherein the input unit is detectable at the presence-sensitive display while the input unit is at least at or near the presence-sensitive display;

determining an overlap distance that the second touch gesture overlaps with the first location;

responsive to determining that the overlap distance is greater than a threshold distance, increasing a determined distance by a distance factor that is based on the overlap distance;

responsive to outputting movement of the second graphical object into contact with the first graphical object, outputting, for display at a third location of the presence-sensitive display, the first graphical object, the third location being the determined distance away from the first location; and responsive to determining that the input unit is no longer detectable at the presence-sensitive display, removing from display, by the computing device, the second graphical object.

15. A computing device, comprising:

an input device that is operatively coupled to the computing device;

an output device that is operatively coupled to the computing device;

one or more processors; and a memory storing instructions that when executed by the one or more processors cause the one or more processors to:

output for display at a first location of the output device, a first graphical object in a graphical user interface;

responsive to receiving, at the input device, an indication of a first gesture that indicates a second location of the output device, determine whether the first location is within a first predetermined distance of the second location, the first and second locations included within the graphical user interface;

responsive to determining whether the first location is within the first predetermined distance of the second location:

if the first location is within the first predetermined distance of the second location, output, for display at the second location of the output device that corresponds to the first gesture, a second graphical object, and if the first location is not within the first predetermined distance of the second location, refraining from outputting the second graphical object;

while the second graphical object is output for display at the presence-sensitive display:

responsive to receiving, at the input device, an indication of a second gesture originating within a second predetermined distance of the second location and moving towards the first location, output, for display at the output device, movement of the second graphical object into contact with the first graphical object, wherein the second gesture comprises a motion of an input unit, wherein the input unit is detectable at the input device while the input unit is at least at or near the input device;

determine an overlap distance that the second touch gesture overlaps with the first location;

responsive to determining that the overlap distance is greater than a threshold distance, increase a determined distance by a distance factor that is based on the overlap distance;

responsive to outputting movement of the second graphical object into contact with the first graphical object, output for display, at a third location of the presence-sensitive display, the first graphical object, the third location being the determined distance away from the first location and responsive to determining that the input unit is no longer detectable at the presence-sensitive display, remove from display, at the output device, the second graphical object.

* * * * *